United States Patent [19]

Asahara et al.

[11] Patent Number: 5,191,527
[45] Date of Patent: Mar. 2, 1993

[54] METHOD OF CONTROLLING AUTOMATIC TRANSMISSION WITH CROSS REFERENCE TO TANDEM GEAR UNITS IN SPEED STAGE SHIFTING

[75] Inventors: Norimi Asahara, Toyota; Yasuo Hojo; Hideo Tomomatsu, both of Nagoya, all of Japan

[73] Assignee: Toyota Jidosha Kabushiki Kaisha, Aichi, Japan

[21] Appl. No.: 621,975

[22] Filed: Dec. 4, 1990

[30] Foreign Application Priority Data

Dec. 6, 1989 [JP] Japan .................. 1-317004

[51] Int. Cl.⁵ ............................ B60K 41/06
[52] U.S. Cl. .................... 364/424.1; 73/866
[58] Field of Search ............ 364/424.1; 74/866, 867, 74/868

[56] References Cited

U.S. PATENT DOCUMENTS

| | | | |
|---|---|---|---|
| 4,680,988 | 7/1987 | Mori | 74/866 |
| 4,700,591 | 10/1987 | Yasue et al. | 74/868 |
| 4,727,772 | 3/1988 | Sumiya et al. | 74/867 |
| 4,781,080 | 11/1988 | Iwatsuki | 74/867 |
| 4,792,902 | 12/1988 | Hrovat et al. | 364/424.1 |
| 4,821,190 | 4/1989 | Patil | 364/424.1 |
| 4,855,914 | 8/1989 | Davis et al. | 364/424.1 |
| 4,875,391 | 10/1989 | Leising et al. | 74/866 |
| 4,942,530 | 7/1990 | Boda et al. | 364/424.1 |
| 4,956,776 | 9/1990 | Carre | 364/424.1 |
| 4,967,355 | 10/1990 | Iwatsuki et al. | 364/424.1 |

FOREIGN PATENT DOCUMENTS 57-86650 5/1982 Japan .
60-201152 10/1985 Japan .

Primary Examiner—Parshotam S. Lall
Assistant Examiner—Collin W. Park
Attorney, Agent, or Firm—Oliff & Berridge

[57] ABSTRACT

In an automatic transmission in a vehicle having a tandem connection of a first gear unit such as lower and upper gear stages and a second gear unit such as having three gear stages so that selective engagement and disengagement of clutches and brakes in each gear unit selectively provide six gear states, a certain clutch or brake of the first gear unit is controlled in reference to a difference between certain target engaged/disengaged condition and actual engaged/disengaged condition of itself in setting up a certain gear stage in the first gear unit as well as to difference between certain target engaged/disengaged condition and actual engaged/disengaged condition of (and further, though optionally, a signal for controlling) a certain clutch or brake of the second gear unit in setting up a certain gear stage in the second gear unit.

19 Claims, 4 Drawing Sheets

METHOD OF CONTROLLING AUTOMATIC TRANSMISSION WITH CROSS REFERENCE TO TANDEM GEAR UNITS IN SPEED STAGE SHIFTING

BACKGROUND OF THE INVENTION

1. Field of the Invention

The present invention relates to a control of an automatic transmission in a vehicle, and more particularly, to a control of a friction engaging means such as a brake and a clutch in the speed stage shifting of an automatic transmission having a tandem connection of speed stage change-over gear units.

2. Description of the Prior Art

It is well known in the art of the automatic transmission in a vehicle to construct the gear train of the automatic transmission by a tandem connection of a first and a second gear unit each including an assembly of gear wheels such as the planetary gear mechanism and friction engaging means such as clutches and brakes so that selective engagement and disengagement of the friction engaging means in each gear unit selectively sets up certain reduction gear ratios in each gear unit while the automatic transmission provides certain overall reduction gear ratios corresponding to the multiplication of the gear ratios in said first and second gear units.

In certain such automatic transmissions, including, for example, the one disclosed in U.S. Pat. No. 5,113,725 scheduled to be assigned to the same assignee as the present application, the first gear unit is changed over between a lower gear stage having a larger reduction gear ratio and a higher gear stage having a smaller reduction gear ratio, while the second gear unit is changed over among three successively raised gear stages having successively decreasing reduction gear ratios, respectively, wherein the lower and higher gear stages of the first gear unit are combined with each of the three gear stages of the second gear unit so that six successively raised gear stages are available to provide six successively decreasing reduction gear ratios.

In such an automatic transmission, a relative difference in the timing of engagement or disengagement of the friction engaging means in the first and second gear units in the changing-over of the gear stages that would generally have a certain fixed tendency such that the changing-over process of the first gear unit always proceeds relatively earlier or later than that of the second gear unit, unless particularly controlled in this respect, could cause greater instability in the gear stage shiftings, because when the first and second gear units are changed over in the same direction (from a lower gear stage to a higher gear stage or vice versa), the above-mentioned relative difference in the speed of progress of the changing-over process inherent to each product due to design or allowance in manufacture is suppressed by interference of operation of each other, while when the first and second gear units are changed over in mutually reversed directions (as in the shifting from the 2nd speed stage to the 3rd speed stage in the embodiment described hereinunder), the above-mentioned relative difference is amplified by compensation of operation of each other.

SUMMARY OF THE INVENTION

In consideration of the above-mentioned problems in the automatic transmission having a tandem connection of a first and a second gear unit, it is the object of the present invention to provide a method of controlling an automatic transmission of such type, whereby any relative difference in the speed of progress of the changing-over processes of the two gear units in a tandem connection is placed under an appropriate control.

According to the present invention the above-mentioned object is accomplished by a method of controlling an automatic transmission in a vehicle having a tandem connection of a first and a second gear unit each including an assembly of gear wheels and friction engaging means so that selective engagement and disengagement of said friction engaging means in each said gear unit selectively sets up certain reduction gear ratios in each said gear unit and so that the automatic transmission provides certain overall reduction gear ratios corresponding to the multiplication of said reduction gear ratios in said first and second gear units, wherein engagement/disengagement of a first one of said friction engaging means of said first gear unit is controlled in reference to an engaged/disengaged condition of said first friction engaging means in setting up a certain gear stage in said first gear unit and also in reference to an engaged/disengaged condition a second one of said friction engaging means of said second gear unit in setting up a certain gear stage in said second gear unit.

In the above-mentioned method, engagement/disengagement of said second friction engaging means of said second gear unit may be controlled in reference to said engaged/disengaged condition of said second friction engaging means in setting up said certain gear stage in said second gear unit and also in reference to said engaged/disengaged condition of said first friction engaging means of said first gear unit in setting up said certain gear stage in said first gear unit.

Further, said engagement/disengagement of said first friction engaging means may further be controlled in reference to a control signal for controlling engagement/disengagement of said second friction engaging means.

Further, said engagement/disengagement of said second friction engaging means may further be controlled in reference to a control signal for controlling engagement/disengagement of said first friction engaging means.

Further, said first gear unit may be changed over so as to decrease reduction gear ratio thereof while said second gear unit is changed over so as to decrease reduction gear ratio thereof in changing over the automatic transmission from a certain first gear stage to a certain second gear stage, and said first gear unit is changed over so as to increase reduction gear ratio thereof while said second gear unit is changed over so as to decrease reduction gear ratio thereof in changing over the automatic transmission from said certain second gear stage to a certain third gear stage.

Further, said first friction engaging means may be controlled by a combination of an electronic computer system and a hydraulic actuation system according to a principle of feedback control so that said electronic computer system computes a target engaged/disengaged condition for said first friction engaging means and said hydraulic actuation system is operated according to a difference between said target engaged/disengaged condition and a current engaged/disengaged condition, wherein said difference is modified by an amount which is decreased along with lapse of time so as to compensate for a delay in operation of said hydraulic actuation system relative to operation of said electronic computer system.

In this case said amount may be asymptotically decreased along with the lapse of time.

Further, said amount may be decreased starting after lapse of a predetermined time from the start of control.

Further, said control may be a cyclic control based upon cyclic picking up of data, computation of an instant value of said target engaged/disengaged condition based upon instant values of said data, and computation of an instant value of said difference, and said difference is modified based upon a comparison of successive ones of such instant values.

In this case, said control may be a cyclic control based upon cyclic picking up of data, computation of an instant value of said target engaged/disengaged condition based upon instant values of said data, and computation of an instant value of said difference, and said difference is further modified so that at least one of said instant values of said difference in the past is added thereto or subtracted therefrom with multiplication of a proportion factor.

BRIEF DESCRIPTION OF THE DRAWINGS

In the accompanying drawings.

DESCRIPTION OF THE PREFERRED EMBODIMENT

In the following the present invention will be described in more detail with respect to a preferred embodiment with reference to the accompanying drawings.

Figure 1:
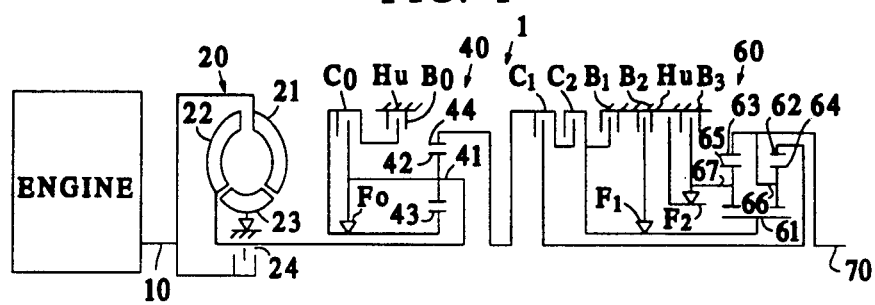
FIG. 1 is a diagrammatical illustration of an automatic transmission in a vehicle having a gear train including a tandem connection of a first and a second gear unit.

Referring to FIG. 1 illustrating diagrammatically an automatic transmission in a vehicle to which the transmission control method according to the present invention may be applied, the transmission generally designated by reference numeral 1 comprises a torque converter 20 of a conventional type having a pump 21 connected with an engine via an input shaft 10, a turbine 22 and a stator 23, a lock-up clutch 24 for selectively directly connecting the pump 21 with the turbine 22, a first gear unit 40 including a planetary gear mechanism having a sun gear 43, a ring gear 44, a planetary pinion 42 and a carrier 41 connected with the turbine 22 of the torque converter 20, a clutch $C_0$ for selectively connecting the sun gear 43 with the carrier 41, a brake $B_0$ for selectively braking the sun gear 43 relative to a housing Hu and a one way clutch $F_0$ for torque transmittingly connecting the sun gear 43 with the carrier 41 only in one rotational direction, and a second gear unit 60 including a first planetary gear mechanism having a sun gear 61, a ring gear 62, a planetary pinion 64 and a carrier 66, a second planetary gear mechanism having a sun gear 61 in common with the sun gear 61 of the first planetary gear mechanism, a ring gear 63, a planetary pinion 65 and a carrier 67, a clutch $C_1$ for selectively connecting the ring gear 62 with the ring gear 44 of the first gear unit 40, a clutch $C_2$ for selectively connecting the sun gears 61 with the ring gear 44 of the first gear unit 40, a brake $B_1$ for selectively braking the sun gears 61 relative to the housing Hu, a series combination of a brake $B_2$ and a one way clutch $F_1$ for selectively braking the sun gears 61 only in one rotational direction when the brake $B_2$ is engaged, a brake $B_3$ for selectively braking the carrier 67 relative to the housing Hu, and a one way clutch $F_2$ for braking the carrier 67 relative to the housing Hu only in one rotational direction, wherein the carrier 66 and the ring gear 63 are connected with one another to serve as an output shaft of the transmission.

Figure 2:
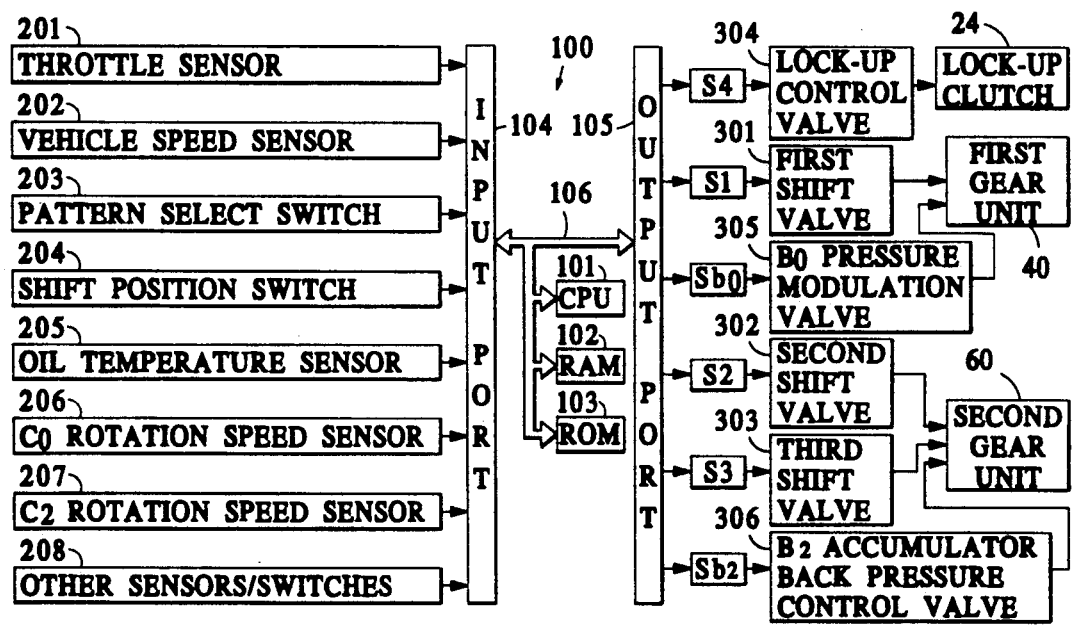
FIG. 2 is a diagrammatical illustration of a control system for changing over the gear train shown in FIG. 1 for various gear stages.

The clutches $C_0$, $C_1$ and $C_2$ and the brakes $B_0$, $B_1$, $B_2$ and $B_3$ may be hydraulically operated to be engaged or disengaged by a electro-hydraulic control system the general concept of which is well known in the art in such a manner that solenoid-operated change-over valves change over supply and exhaust of hydraulic pressure to and from the respective clutches and brakes under the control of an electronic control unit. FIG. 2 shows such an electro-hydraulic control system in a diagrammatical illustration with respect to some components thereof relevant to the description of the present invention, wherein certain components are more relevant to the present invention as described hereinunder.

The tandem connection of the first gear unit 40 and the second gear unit 60 can be controlled according to the conventional method to provide four forward speed stages by the second gear unit 60 being changed over between three different gear ratios while the first gear unit 40 is maintained in its lower gear stage so that the 1st, 2nd and 3rd speed stages are provided, and then by the first gear unit 40 being changed over to its higher gear stage while the second gear unit 60 is maintained at the 3rd speed stage so that the 4th speed stage is provided as an overdrive stage. (Of course a reverse stage is also provided, as is well known in the art.) However, the tandem connection of the first gear unit 40 and the second gear unit 60 shown in FIG. 1 is herein controlled by the electro-hydraulic control unit shown in FIG. 2 so as to provide six forward speed stages by on and off combinations of the clutches $C_0$–$C_2$, the brakes $B_0$–$B_3$ and the one way clutches $F_0$–$F_2$ as shown in Table 1:

TABLE 1

| Range | Speed | C0 | B0 | C1 | C2 | B1 | B2 | B3 | F0 | F1 | F2 |
|---|---|---|---|---|---|---|---|---|---|---|---|
| R | — | o | | | o | | | o | o | | |
| D | 1st | o | | o | | | | | | o | o |
| D | 2nd | | o | o | | | | | | | o |
| D | 3rd | o | | o | | | o | | o | o | |
| D | 4th | | o | o | | | o | | | o | |
| D | 5th | o | | o | o | | o | | o | | |
| D | 6th | | o | o | o | | o | | | | |
| 2 | 1st | o | | o | | | | | | o | o |
| 2 | 2nd | | o | o | | | o | | | | o |
| L | 1st | o | | o | | | | o | | o | o |

In the above table, "o" indicates that the clutch, brake or one way clutch is engaged at the corresponding speed stage under the corresponding shift range.

As will be noted in the above table, the first gear unit 40 is changed over from the lower gear stage having a larger reduction gear ratio to the higher gear stage having a smaller reduction gear ratio in the upshifting from the 1st to the 2nd speed stage, from the 3rd to the 4th speed stage and from the 5th to the 6th speed stage, while it is changed over from the higher gear stage to the lower gear stage in the upshifting from the 2nd to the 3rd speed stage and from the 4th to the 5th speed stage.

Referring to FIG. 2, the electro-hydraulic control system comprises an electronic control unit 100 which is now available in various standards in the art as a hardware generally including a central processing unit (CPU) 101, a random access memory (RAM) 102, a read only memory (ROM) 103, an input port means 104, an output port means 105 and a common bus means 106 interconnecting these components The electronic control unit 100 is supplied with various data through the input port means 104 such as throttle opening from a throttle sensor 201, vehicle speed from a vehicle speed sensor 202, patterns of driving such as the economy pattern putting preference on the economical performance of the vehicle and the power pattern putting preference on the power performance of the vehicle from a pattern select switch 203, shift positions such as the R, N, D, 2 and L set by a manual lever from a shift position switch 204, oil temperature from an oil temperature sensor 205, rotational speed of an outer drum of the clutch Co from a $C_0$ rotation speed sensor 206, rotational speed of an outer drum of the clutch $C_2$ from a $C_2$ rotation speed sensor 207 and other data from other sensors and/or switches or the like generally designated by 208.

In the electronic control unit 100, the CPU 101 conducts certain calculations including those described in detail hereinunder particularly according to the present invention based upon the data received from the sensors and/or switches and the programs stored in the ROM 103 in cooperation with the RAM 102, and outputs control signals to a hydraulic control means including various standard components not shown in the figure and particularly the following components:

$S_1$ is a solenoid valve which controls, according to on and off thereof, the changing-over of a first shift valve 301 which controls supply and exhaust of oil pressure to and from the clutch $C_0$ and the Brake $B_0$ of the first gear unit 40.

$S_2$ and $S_3$ are solenoid valves which control, according to on and off thereof, the changing-over of a second shift valve 302 and a third shift valve 303 which control supply and exhaust of oil pressure to and from the clutches $C_1$ and $C_2$ and the brakes $B_1$, $B_2$ and $B_3$ of the second gear unit 60.

$S_4$ is a solenoid valve which controls, according to on and off thereof, the change-over of a lock-up control valve 304 which controls supply and exhaust of oil pressure to and from the lock-up clutch 24.

$Sb_0$ is a solenoid valve which controls, according to periodic on and off thereof, an opening of a $B_0$ pressure modulation valve 305 which controls oil pressure in the brake $B_0$ so that the pressure in the brake $B_0$ is continually changed according to the duty ratio of the on and off of the solenoid valve $Sb_0$.

$Sb_2$ is a solenoid valve which controls, according to periodic on and off thereof, an opening of a $B_2$ accumulator back pressure control valve 306 which controls back pressure in an accumulator for the brake $B_2$ so that the speed of progress of engagement or disengagement of the brake $B_2$ is continually changed according to the duty ratio of the on and off of the solenoid valve $Sb_2$.

The method of control of the automatic transmission according to the present invention will be described with respect to upshifting the transmission from the 2nd speed stage to the 3rd speed stage during which, in the first gear unit 40 the brake $B_0$ is disengaged while the clutch $C_0$ is engaged so that it is changed over from its higher gear stage to its lower gear stage, and in the second gear unit 60 the brake $B_2$ is newly engaged so that it is changed over from its second gear stage to its third gear stage, resulting in an upshifting of the transmission as a whole.

The art of gradually exhausting oil pressure from the brake $B_0$ (in fact a hydraulic chamber thereof) in exchange with gradually supplying oil pressure to the clutch $C_0$ (in fact also a hydraulic chamber thereof) is generally well known. In this connection, it is also well known to relate the timing of such exhaust of oil pressure with the timing of such supply of oil pressure. Similarly, the art of gradually supplying oil pressure to the brake $B_2$ is also well known.

In addition to such conventional timing control of supply or exhaust of oil pressure in each the two gear units, the timing of supply or exhaust of oil pressure to or from the clutches or brakes is further interrelated between the two gear units according to the present invention as described in detail hereinunder.

Figure 3:
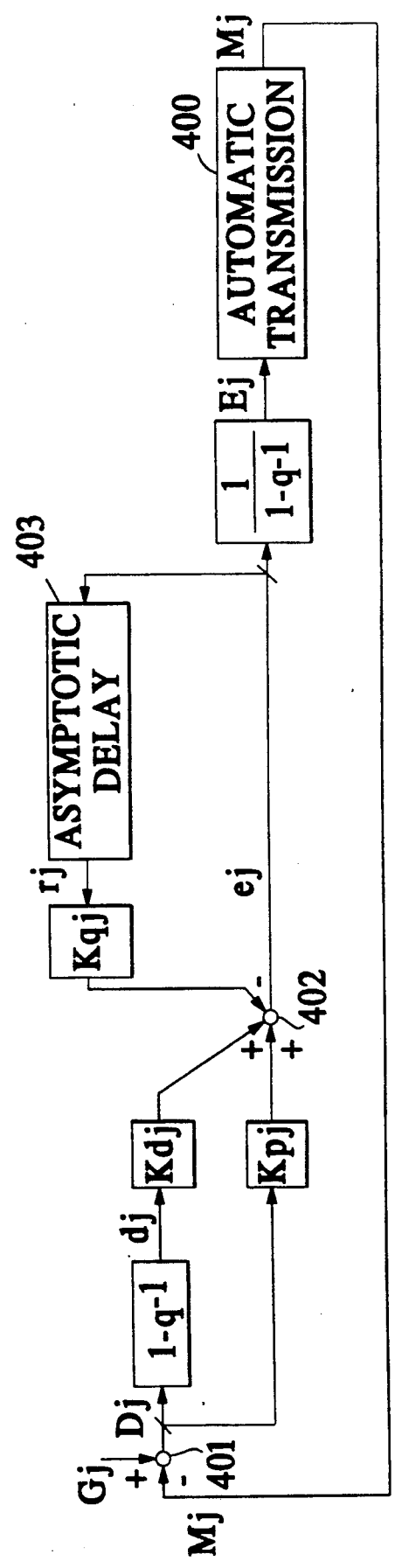
FIG. 3 is a diagrammatical illustration in the form of a control circuit of an embodiment of the method of controlling an automatic transmission according to the present invention.

In FIG. 3, a control circuit which is employed for embodying the present invention is shown in its essential portions. In the above-mentioned upshifting from the 2nd speed stage to the 3rd speed stage, the progress of changing over of the first gear unit 40 may be monitored by the rotational speed $Nc_0$ of the clutch $C_0$, and that of the second gear unit 60 may be monitored by the rotational speed $Nc_2$. These control parameters may correspond to $Mj$ ($j=1, 2, 3, \ldots$), which can be processed by a common control circuit such as shown in FIG. 2 because the control system herein shown is a digital control system which operates based upon digital signals processed in succession, and therefore it can handle a plurality of parallel control systems as parallelly proceeded. The automatic transmission 400 provides output state signals $Mj$, while the electronic computer unit 100 provides target values $Gj$ for the control parameters $Mj$. In the control circuit the difference between the control signals $Gj$ and the output states signals $Mj$ are determined at an adder 401, and the differences $Dj$ are processed by an operator "$1-q^{-1}$", wherein $q^{-1}$ is a sampling delay operator which picks up data obtained at a data sampling process preceding by one cycle to the current data sampling process. Thus deviations $dj$ of the current values of $Dj$ from those at the preceding cycle are obtained.

The differences $Dj$ are multiplied by factors $Kpj$, while the deviations $dj$ are multiplied by factors $Kdj$, and the two outcomes are added at an adder 402 with one another and reduced by the delay compensation amounts $Kqj.rj$ described hereinunder to generate control deviations $ej$, which are then processed by an operator "$1/1-q^{-1}$" so that the control deviations $ej$ are re-converted to control amounts $Ej$ which are supplied to the automatic transmission 400 as control inputs therefor.

Figure 4:
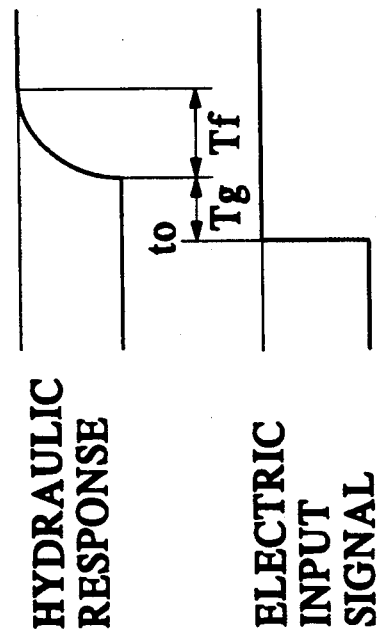
FIG. 4 is a diagram illustrating a delay in the operation of the hydraulic actuation system relative to the electronic computer system.

When the electronic computer system generates a control output signal to change over the transmission from a certain first speed stage to a certain second speed stage at a certain moment to, as shown in FIG. 4, the hydraulic pressure in a clutch or a brake which is newly supplied with the hydraulic pressure for setting up said certain second gear stage is delayed as shown in FIG. 4, wherein the delay includes a time lag Tg which lapses before the hydraulic pressure starts to increase and an asymptotic delay Tf such as a first order delay, a second order delay or a further order delay during which the hydraulic pressure gradually increases so as asymptotically to approach the final value thereof.

In the electro-hydraulic control of the automatic transmission in a vehicle the electronic control system generally provides its output control signal in the form of a series of electric pulses to be supplied to a solenoid valve in the hydraulic actuation system, said pulse signal having a duty ratio representing the instructions to be given to the hydraulic actuation system. If the electronic computer system operates to produce an output signal such as said pulse signal having a variable duty ratio based upon only such input data as throttle opening of the engine determined by stepping on an accelerator pedal by the driver, patterns of driving such as the economy pattern putting preference on the economical performance of the vehicle and the power pattern putting preference on the power performance of the vehicle selected at a pattern select switch operated by the driver, and shift positions such as the R, N, D, 2 and L set up by a manual lever handled by the driver, the delay in response of the hydraulic actuation system as shown in FIG. 4 would cause no substantial problem. However, if the control computation in the electronic computer system also refers to such data as vehicle speed, oil temperature in the engine, rotational speed of certain rotation member so as to modify the curve of asymptotic approach of the hydraulic pressure to its target value for a better speed stage shifting performance of the automatic transmission, the delay in the hydraulic actuation system seriously affects the performance of the automatic transmission control as the vehicle speed and the rotational speed of said certain rotation member are directly affected by such delay in the operation of the hydraulic actuation system thereby substantially disturbing the feedback gain. Therefore, certain measures are required to deal with such a delay in the hydraulic actuation system if high performance of the automatic transmission is to be ensured based upon wide variety of operation parameters having more or less influence on the operation of the automatic transmission.

In order to compensate for the delay in the operation of the hydraulic actuation system the signals ej are processed by an operator 403 which provides an asymptotic such as a first order delay, a second order delay or further order delay to its input. The outputs rj of the operator 403 are multiplied by factors Kqj to provide compensation amounts which are subtracted from Kpj.Dj and Kdj.dj at the adder 402 so that the control deviations ej may be provisionally increased for certain amounts in an early stage of control to compensate for the delay in the operation of the hydraulic actuation system but such certain amounts for compensation are gradually cancelled as the delay in the operation of the hydraulic actuation system are caught up. By appropriately setting up the performance of the asymptotic delay function of the operator 403, the overall gain of the feedback control for the automatic transmission 400 is optimized throughout the entire operational period thereof so that high transmission shifting performance is available.

Figure 5:
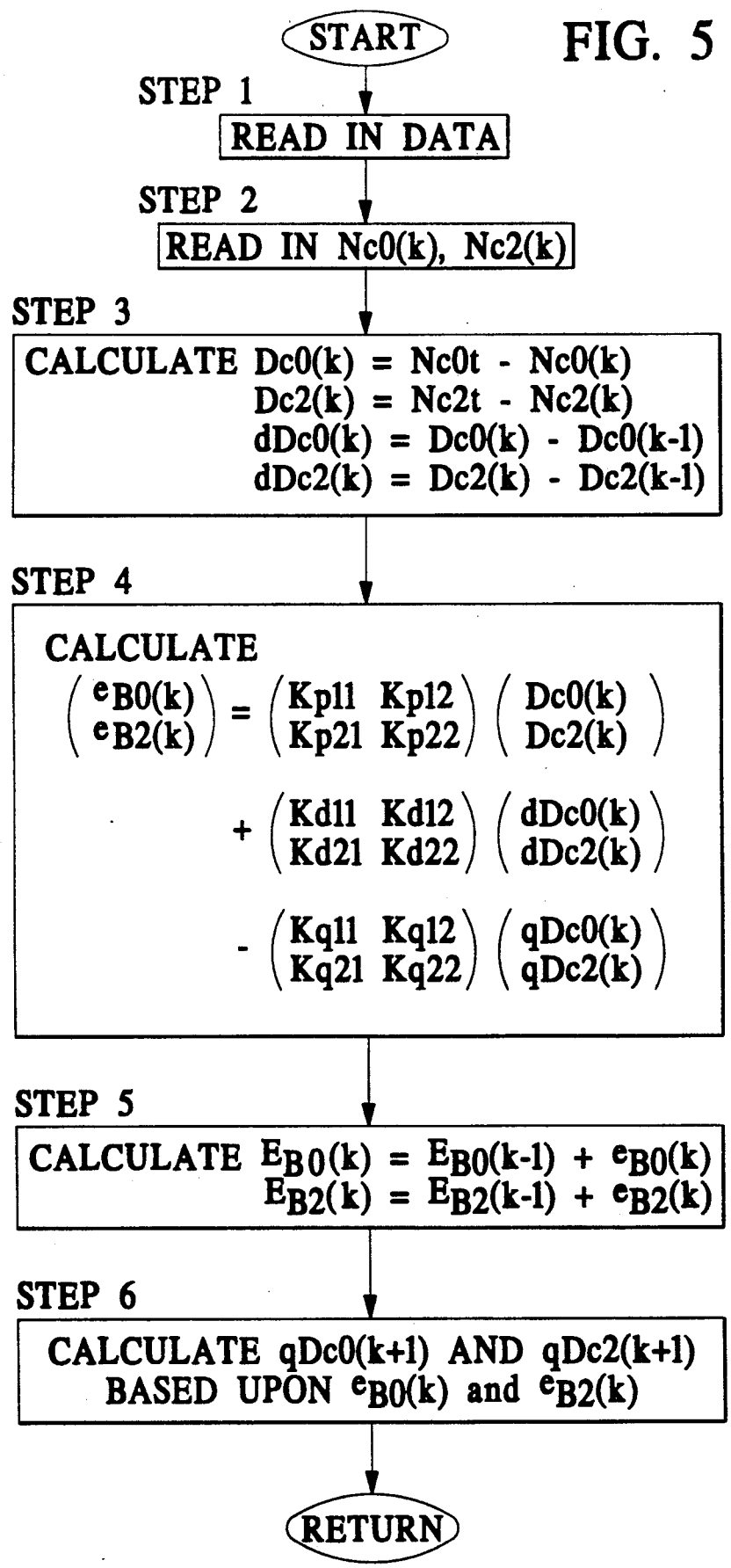
FIG. 5 is a flowchart illustrating a control process carried out according to the present invention.

As described hereinunder with reference to FIG. 5, the factors Kpj, Kdj and Kqj and the functions of the asymptotic delay means 403 are prepared in the ROM 103 in four sets, wherein the first set is prepared for computing a first variable for controlling the first gear unit 40 as self-contained, the second set is prepared for computing a second variable for controlling the second gear unit 60 as self-contained, the third set is prepared for computing said first variable for controlling the first gear unit 40 as interrelated with the operational conditions and the control of the second gear unit 60, and the fourth set is prepared for computing said second variable for controlling the second gear unit 60 as interrelated with the operational conditions and the control of the first gear unit 40.

FIG. 5 shows the control process carried out according to the control circuit shown in FIG. 3 in upshifting the transmission shown in FIG. 1 from the 2nd speed stage to the 3rd speed stage.

Referring to FIG. 5, the control according to this flowchart is periodically repeated with a certain appropriate cycle time such as several microseconds. When the control is started, in step 1 data are read in from various sensors such as shown in FIG. 2, except the rotational speed $Nc_0$ of the clutch $C_0$ and the rotational speed $Nc_2$ of the clutch $C_2$, and then control proceeds to step 2.

In step 2, the rotational speed $Nc_0$ of the clutch $C_0$ and the rotational speed $Nc_2$ of the clutch $C_2$ are read in as the rotational speeds of the outer drums of the clutches $C_0$ and $C_2$, respectively, and then control proceeds to step 3.

In step 3, a difference of a current value of rotational speed of the clutch $C_0$ ($Nc_0(k)$) from a certain target value therefor ($Nc_0t$) calculated by the CPU 101 is calculated ($Dc_0(k)$), and similarly a difference of a current value of rotational speed of the clutch $C_2$ ($Nc_2(k)$) representing the progress of engagement of the brake $B_2$ from a certain target value therefor ($Nc_2t$) calculated by the CPU 101 is calculated ($Dc_2(k)$):

$$Dc_0(k) = Nc_0t - Nc_0(k)$$

$$Dc_2(k) = Nc_2t - Nc_2(k).$$

$Dc_0(k)$ and $Dc_2(k)$ correspond to Dj in FIG. 3.

Further, in step 3, differences in the values of $Dc_0$ and $Dc_2$ between each two subsequent cycles are calculated ($dDc_0$ and $dDc_2$), starting from appropriate initial values set therefor, as follows:

$$dDc_0(k) = Dc_0(k) - Dc_0(k-1)$$

$$dDc_2(k) = Dc_2(k) - Dc_2(k-1).$$

$dDc_0(k)$ and $dDc_2(k)$ correspond to dj in FIG. 3.

Then the control proceeds to step 4. In step 4, control deviations $eB_0(k)$, $eB_2(k)$ for operating the solenoid valves $Sb_0$ and $Sb_2$ so as to modify the engagement of the clutch $C_0$ in turn of disengagement of the brake $B_0$ and the engagement of the brake $B_2$ are calculated according to the following formulae:

$$\begin{pmatrix} eB0(k) \\ eB2(k) \end{pmatrix} = \begin{pmatrix} Kp11 & Kp12 \\ Kp21 & Kp22 \end{pmatrix} \begin{pmatrix} Dc0(k) \\ Dc2(k) \end{pmatrix} +$$

$$\begin{pmatrix} Kd11 & Kd12 \\ Kd21 & Kd22 \end{pmatrix} \begin{pmatrix} dDc0(k) \\ dDc2(k) \end{pmatrix} -$$

$$\begin{pmatrix} Kq11 & Kq12 \\ Kq21 & Kq22 \end{pmatrix} \begin{pmatrix} qDc0(k) \\ qDc2(k) \end{pmatrix}$$

Herein $Kp_{11}$, $Kd_{12}$, $Kp_{21}$ and $Kp_{22}$ correspond to Kpj in FIG. 3, $Kd_{11}$, $Kd_{12}$, $Kd_{21}$ and $Kd_{22}$ correspond to Kdj in FIG. 3 and $Kq_{11}$, $Kq_{12}$, $Kq_{21}$ and $Kq_{22}$ correspond to Kqj in FIG. 3. Further, $Kp_{11}$, $Kd_{11}$ and $Kq_{11}$ are said first set of factors, $Kp_{22}$, $Kd_{22}$, and $Kq_{22}$ are said second set of factors for controlling the timing of engagement or disengagement of the clutches or brakes in each gear unit as self contained which themselves are conventional, whereas $Kp_{12}$, $Kd_{12}$ and $Kq_{12}$ are said third set of factors for controlling the timing of engagement or disengagement of the clutches or brakes in the first gear unit according to the operational conditions and/or the control signal of the second gear unit, and $Kp_{21}$, $Kd_{21}$ and $Kq_{21}$ are said fourth set of factors for controlling the timing of engagement or disengagement of the clutches or brakes in the second gear unit according to the operational conditions and/or of the first gear unit.

In step 5, the control deviations ej(k) are re-converted to control amounts Ej(k) which are supplied to the automatic transmission as control inputs therefor.

Further, qDc0(k) and qDc2(k) are the values corresponding to rj in FIG. 3 which are obtained in the next step 6 in each preceding cycle of control. Of course in the first cycle of control after start certain predetermined initial values may be given to these variables.

Figure 6:
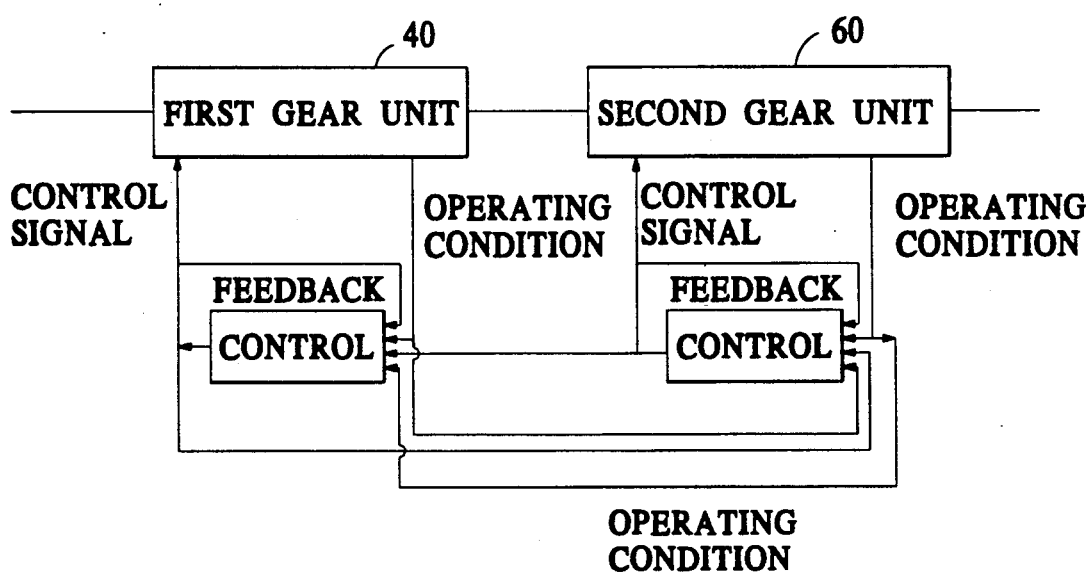
FIG. 6 is a diagram illustrating the control carried out according to the present invention.

Thus the brake $B_0$ and the clutch $C_0$ are controlled in reflection of the progress of the engagement of the brake $B_2$ on the one hand, while the engagement of the brake $B_2$ is controlled in reflection of the progress of disengagement of the brake $B_0$ and the engagement of the clutch $C_0$ on the other hand. Such control interrelations between the first gear unit 40 and the second gear unit 60 are diagrammatically illustrated in FIG. 6.

By such mutual reflection the timing of changing-over of gear stages of the first gear unit between its higher gear stage and its lower gear stage and that of the second gear unit among its three gear stages are controlled in reflection of the progress of one another, so that, regardless whether the direction of upshifting or downshifting of the first gear unit is the same as or opposite to that of the second gear unit, the relative timing between the two gear units is always maintained at certain desired conditions.

Although the invention has been described in detail with respect to a preferred embodiment thereof, it will be apparent to those skilled in the art that various modifications are possible without departing from the scope of the present invention.

We claim:

1. A method of controlling an automatic transmission in a vehicle having a tandem connection of a first gear unit and a second gear unit, each gear unit including an assembly of gear wheels and friction engaging means so that a specified gear ratio is established in each gear unit by selective engagement and disengagement of the friction engaging means, the method comprising the steps of:
   a) determining a rotational speed of a first friction engaging means in the first gear unit and a rotational speed of a third friction engaging means in the second gear unit;
   b) identifying a predetermined target rotational speed for each of the first and third friction engaging means;
   c) calculating a difference between the target rotational speed and the rotational speed for each of the first and third friction engaging means;
   d) calculating a cycle difference from the differences between the target and rotational speeds at two successive cycles for each of the first and third friction engaging means;
   e) multiplying the difference by a first factor and the cycle difference by a second factor to obtain first and second interim values for the first and third friction engaging means;
   f) subtracting a correction value from the interim values to obtain a control deviation for each first and third friction engaging means, said correction value providing delay compensation for engagement/disengagement of the friction engaging means to include elements wherein engagement/disengagement of the first friction engaging means of the first gear unit is controlled in reference to engagement/disengagement of a second friction engaging means of the first gear unit in setting up a certain gear stage in the first gear unit and also in reference to engagement/disengagement of a fourth friction engaging means in setting up a certain gear stage in the second gear unit;
   g) converting each control deviation to a control amount for controlling a rate of changeover of the second friction engaging means of the first gear unit and the fourth friction engaging means of the second gear unit from a first gear stage to the certain gear stage respectively, wherein the steps are cyclicly repeated at a predetermined time interval.

2. A method according to claim 1, wherein engagement/disengagement of said fourth friction engaging means of said second gear unit is controlled in reference to said engaged/disengaged condition of said fourth friction engaging means in setting up said certain gear stage in said second gear unit and also in reference to said engaged/disengaged condition of said first friction engaging means of said first gear unit in setting up said certain gear stage in said first gear unit.

3. A method according to claim 2, wherein said engagement/disengagement of said third friction engaging means of said second gear unit is further controlled in reference to a control signal for controlling engagement/disengagement of said fourth friction engaging means of said second gear unit.

4. A method according to claim 2, wherein said engagement/disengagement of said fourth friction engaging means of said second gear unit is further controlled in reference to a control signal for controlling engagement/disengagement of said third friction engaging means of said second gear unit.

5. A method according to claim 1, wherein said first gear unit is changed over so as to decrease reduction gear ratio thereof while said second gear unit is changed over so as to decrease reduction gear ratio thereof in changing over the automatic transmission from a first gear stage to a second gear stage, and said first gear unit is changed over so as to increase reduction gear ratio thereof while said second gear unit is changed over so as to decrease reduction gear ratio thereof in changing over the automatic transmission from said second gear stage to a third gear stage.

6. A method according to claim 1, wherein said first friction engaging means is controlled by a combination of an electronic computer system and a hydraulic actuation system according to a principle of feedback control so that said electronic computer system computes a target engaged/disengaged condition for said first friction engaging means and said hydraulic actuation system is operated according to a difference between said target engaged/disengaged condition and a current engaged/disengaged condition, wherein said difference is modified by an amount which is decreased with an increase in elapsed time so as to compensate for a delay in operation of said hydraulic actuation system relative to operation of said electronic computer system.

7. A method according to claim 6, wherein said amount is asymptotically decreased along with the increase in elapsed time.

8. A method according to claim 6, wherein said amount is started decreasing after lapse of a predetermined time from the start of control.

9. A method according to claim 6, wherein the step of calculating a cycle difference comprises:
    a) storing the difference from a k−1 cycle in a memory; and
    b) subtracting the difference at the k−1 cycle from the difference at a k cycle to obtain said cycle difference, wherein the k cycle is a current control cycle and the k−1 cycle is a next proceeding control cycle.

10. A method as claimed in claim 9, wherein said correction value in a first cycle is a predetermined value and in subsequent cycles is calculated using the control deviation determined in the preceding cycle.

11. A method as claimed in claim 1, wherein said correction valve has four components:
    a first component related to control of the first gear unit with respect to itself;
    a second component related to control of the second gear unit with respect to itself;
    a third component related to control of the first gear unit with respect to the second gear unit; and
    a fourth component related to control of the second gear unit with respect to the first gear unit.

12. A method as claimed in claim 1, wherein said predetermined time interval is several microseconds.

13. A method for controlling an automatic transmission in a vehicle having a tandem connection of first and second gear units each including an assembly of gear wheels and friction engaging means so that selective engagement and disengagement of said friction engaging means in each gear unit selectively set up certain reduction gear ratios in said each gear unit and so that the automatic transmission provides certain overall reduction gear ratios corresponding to the multiplication of said reduction gear ratios in said first and second gear units, the method comprising a cyclic repetition of the steps of:
    calculating a target value of an engagement/disengagement condition of said first gear unit;
    calculating a target value of an engagement/disengagement condition of said second gear unit;
    calculating a first difference between said target value and a current value of said engagement/disengagement condition of said first gear unit;
    calculating a second difference between said target value and a current value of said engagement/disengagement condition of said second gear unit;
    generating a first control signal for controlling said engagement/disengagement condition of said first gear unit based upon said first difference as well as said second difference;
    generating a second control signal for controlling said engagement/disengagement condition of said second gear unit based upon said second difference as well as said first difference;
    controlling said engagement/disengagement condition of said first gear unit based upon said first control signal; and
    controlling said engagement/disengagement condition of said second gear unit based upon said second control signal.

14. A method according to claim 13, wherein said engagement/disengagement condition of said first gear unit is a rotational speed of one of said friction engaging means of said first gear unit.

15. A method according to claim 13, wherein said engagement/disengagement condition of said second gear unit is a rotational speed of one of said friction engaging means of said second gear unit.

16. A method according to claim 13, wherein said first control signal is modified by a difference between the value of said first difference in the current cycle and the value of said first difference in a cycle preceding the current cycle as well as a difference between the value of said second difference in the current cycle and the value of said second difference in said cycle preceding the current cycle.

17. A method according to claim 16, wherein said first control signal is further modification by a asymptotic magnification thereof which simulates an asymptotic delay in a change of said engagement/disengagement condition of said first gear unit in a response thereof to said first control signal as well as by an asymptotic magnification of said second control signal which simulates an asymptotic delay in a change of said engagement/disengagement condition of said second gear unit in a response thereof to said second control signal.

18. A method according to claim 13, wherein said second control signal is modified by a difference between the value of said second difference in the current cycle and the value of said second difference in a cycle preceding the current cycle as well as a difference between the value of said first difference in the current cycle and the value of said first difference in said cycle preceding the current cycle.

19. A method according to claim 18, wherein said second control signal is further modified by an asymptotic magnification thereof which simulates an asymptotic delay in a change of said engagement/disengagement condition of said second gear unit in a response thereof to said second control signal as well as by an asymptotic magnification of said first control signal which simulates an asymptotic delay in a change of said engagement/disengagement condition of said first gear unit in a response thereof to said first control signal.

* * * * *